United States Patent
Miao et al.

(10) Patent No.: US 8,588,501 B2
(45) Date of Patent: Nov. 19, 2013

(54) AUTOMATIC POSE INITIALIZATION FOR ACCURATE 2-D/3-D REGISTRATION APPLIED TO ABDOMINAL AORTIC ANEURYSM ENDOVASCULAR REPAIR

(75) Inventors: Shun Miao, Plainsboro, NJ (US); Joseph Lucas, Paris (FR); Rui Liao, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 3 days.

(21) Appl. No.: 13/473,049

(22) Filed: May 16, 2012

(65) Prior Publication Data
US 2013/0058555 A1    Mar. 7, 2013

Related U.S. Application Data

(60) Provisional application No. 61/513,089, filed on Jul. 29, 2011.

(51) Int. Cl.
*G06K 9/00*    (2006.01)
(52) U.S. Cl.
USPC ........................................................ 382/132
(58) Field of Classification Search
USPC ............................ 382/128, 130, 132; 128/922
See application file for complete search history.

(56) References Cited

U.S. PATENT DOCUMENTS

2006/0280351 A1 *  12/2006  Luping et al. .................. 382/128
2010/0309198 A1 *  12/2010  Kauffmann .................... 345/419

OTHER PUBLICATIONS

Alexander Telea, et al., "An Augmented Fast Marching Method for Computing Skeletons and Centerlines," Joint EUROGRAPHICS—IEEE TCVG Symposium on Visualization (2002).
Shun Miao, et al., "Toward Smart Utilization of Two X-Ray Images for 2-D/3-D Registration Applied to Abdominal Aortic Aneurysm Interventions", BMEI, 550-555, (2011).
Alejandro F. Frangi, et al., "Multiscale Vessel Enhancement Filtering", Medical Image Computing and Computer-Assisted Intervention, LNCS vol. 1496, pp. 130-137, 1998.

* cited by examiner

*Primary Examiner* — Andrew W Johns
(74) *Attorney, Agent, or Firm* — Donald B. Paschburg; F. Chau & Associates, LLC (57) ABSTRACT

A method for automatically initializing pose for registration of 2D fluoroscopic abdominal aortic images with a 3D model of an abdominal aorta includes detecting a 2D iliac bifurcation and a 2D renal artery bifurcation from a sequence of 2D fluoroscopic abdominal aortic images, detecting a spinal centerline in a 2D fluoroscopic spine image, providing a 3D iliac bifurcation and a 3D renal artery bifurcation from a 3D image volume of the patient's abdomen, and a 3D spinal centerline from the 3D image volume of the patient's abdomen, and determining pose parameters $\{x, y, z, \theta\}$, where $(x, y)$ denotes the translation on a table plane, z denotes a depth of the table, and $\theta$ is a rotation about the z axis, by minimizing a cost function of the 2D and 3D iliac bifurcations, the 2D and 3D renal artery bifurcation, and the 2D and 3D spinal centerlines.

20 Claims, 6 Drawing Sheets

AUTOMATIC POSE INITIALIZATION FOR ACCURATE 2-D/3-D REGISTRATION APPLIED TO ABDOMINAL AORTIC ANEURYSM ENDOVASCULAR REPAIR

CROSS REFERENCE TO RELATED UNITED STATES APPLICATIONS

This application claims priority from "Automatic Pose Initialization for Accurate 2-D/3-D Registration Applied to Abdominal Aortic Aneurysm Endovascular Repair", U.S. Provisional Application No. 61/513,089 of Miao, et al., filed Jul. 29, 2011, the contents of which are herein incorporated by reference in their entirety.

TECHNICAL FIELD

This disclosure is directed to methods for initializing the pose for 2-D/3-D registration of digital medical images.

DISCUSSION OF THE RELATED ART

An abdominal aortic aneurysm (AAA) is a localized ballooning of the abdominal aorta. There is a risk of rupture of the aneurysm if the expansion becomes large enough, and the mortality rate of AAA rupture is up to 90%. In recent years, interventional repairs have emerged as an alternative to the classic "open" invasive surgery for treating AAA. This minimally invasive AAA stenting can be greatly facilitated by overlaying the preoperative 3-D model of the abdominal aorta onto the intra-operative 2-D X-ray images. During the interventional procedure, the guidance and navigation for remote manipulation of the catheters and grafts within the aorta are provided by real-time X-ray imaging with injected contrast medium.

Recently, using 2-D/3-D registration techniques, high-resolution pre-operative computed tomography (CT) volume and intra-operative 2-D X-ray image can be brought into the same coordinate system to provide realistic artery anatomy during the navigation and deployment of the stent grafts. Accurate 2-D/3-D registration in 3-D space makes the 2-D/3-D overlay robust to the change of C-Arm angulations. By far, the 2-D/3-D registration methods based on simulated X-ray projection images using multiple image planes have been shown to be able to provide satisfactory 3-D registration accuracy. However, one drawback of the intensity-based 2-D/3-D registration methods is that the similarity measure is usually highly non-convex and hence the optimizer can easily be trapped into local minima. User interaction therefore is often needed in the initialization of the position of the 3-D model in order to get a successful 2-D/3-D registration. By far, the most reported 2-D/3-D registration methods in literatures are based on simulated X-ray images produced from the 3-D volume called Digital Reconstructed Radiographs (DRRs). DRR-based 2-D/3-D registration methods are shown to be very accurate, especially when multiple image planes are employed. However, the similarity measure for intensity-based 2-D/3-D registration methods is usually highly non-convex and hence the optimizer can easily be trapped into local minima. User interaction therefore is often needed in the initialization of the position of the 3-D model in order to get a successful 2-D/3-D registration. In addition, a clinical constraint of DRR-based registration method is its small capture range, which also requires manual initialization of the volume position to bring the parameters to be estimated into the capture range.

The paper by Miao, S., Liao, R., Pfister, M., "Toward Smart Utilization of Two X-Ray Images for 2-D/3-D Registration Applied to Abdominal Aortic Aneurysm Intervention", BMEI, 550-555, (2011), hereinafter referred to as Miao, et al., herein incorporated by reference in its entirety, proposed to use bi-plane images, one digital subtracted angiograph (DSA) of the contrasted abdominal aorta and one native X-ray image of the spine, for accurate 2-D/3-D registration. It has achieved good convergence rate and registration accuracy with manual initialization bringing the 3-D volume into a 15 mm capture range, but requires a manual initialization.

SUMMARY

Exemplary embodiments of the invention as described herein generally include methods and systems for a landmark-based 3-D pose initialization of the 3-D volume position to eliminate the requirement on manual initialization, that detect vessel bifurcation points and spine centerline in both 2-D and 3-D images, and use landmarks of vessel bifurcations to estimate the patient's orientation and translation on the table plane, and landmarks of the spine to estimate the table depth to bring the 3-D volume into a 15 mm capture range. Experimental results show that a method according to an embodiment of the invention can robustly provide a good initialization for 2-D/3-D registration and bring the 3-D volume into the 15 mm capture range, thus making the 2-D/3-D registration workflow for AAA intervention fully automatic.

According to an aspect of the invention, there is provided a method for automatically initializing pose for registration of 2D fluoroscopic abdominal aortic images with a 3D model of an abdominal aorta, including detecting a 2D iliac bifurcation and a 2D renal artery bifurcation from a sequence of 2D fluoroscopic abdominal aortic images obtained from a patient, detecting a spinal centerline in a 2D fluoroscopic spine image, providing a 3D iliac bifurcation and a 3D renal artery bifurcation from a 3D image volume of the patient's abdomen, and a 3D spinal centerline from the 3D image volume of the patient's abdomen, and determining pose parameters $\{x, y, z, \theta\}$, where $(x, y)$ denotes the translation on a table plane, $z$ denotes a depth of the table, and $\theta$ is a rotation about the z axis, by minimizing a cost function $(C_A + C_S)$, where $C_A$ is defined as $$C_A = \sqrt{\sum_{i=1}^{2}(B_i^{2D} - P_1(H \cdot B_i^{3D}))^2},$$

where $P_1$ is a projection of the 3-D bifurcations to an aortic image plane, $B_1^{2D}$ and $B_1^{3D}$ are the respective 2-D and 3-D bifurcations of the iliac arteries, $B_2^{2D}$ and $B_2^{3D}$ are the respective 2-D and 3-D bifurcations of the renal arteries, and $$H(x, y, z, \theta) = \begin{bmatrix} \cos\theta & -\sin\theta & 0 & 0 \\ \sin\theta & \cos\theta & 0 & 0 \\ 0 & 0 & 1 & 0 \\ x & y & z & 1 \end{bmatrix}$$

is the homogenous transformation matrix of the registration parameters, and $C_S$ is defined as $C_S = \text{Dist}(L_{spine}, P_2(H \cdot B_3^{3D}))$, where $P_2$ is a projection of the 3D spine centerline to a spinal image plane, $B_3^{3D}$ is a 3-D spinal landmark that is a point a predetermined distance behind the renal artery bifurcations, $L_{spine}$ is the 2-D spinal centerline, and Dist(,) is a point-to-line distance in 2-D.

According to a further aspect of the invention, detecting an iliac bifurcation and a renal artery bifurcation includes calculating a maximum opacity image from the sequence of 2D fluoroscopic abdominal aortic images obtained from a patient, binarizing the maximum opacity image to obtain an aortic silhouette, skeletonizing the aortic silhouette in the binarized maximum opacity image to extract an aortic centerline, and detecting the iliac bifurcation and renal artery bifurcation from the aortic centerline.

According to a further aspect of the invention, the sequence of 2D fluoroscopic abdominal aortic images were preprocessed to subtract a pre-contrast image from each image of the sequence of 2D fluoroscopic images, where the patient was provided with a contrast injection prior to acquiring the sequence of 2D fluoroscopic images.

According to a further aspect of the invention, calculating the maximum opacity image $O(x,y)$ comprises calculating $O(x,y)=\min_j S_j(x,y)$, where $S_j=I_j-I_0$, where $I_0$ is the pre-contrast image and $I_j$ is the $j^{th}$ image in the sequence of 2D fluoroscopic images.

According to a further aspect of the invention, binarizing the maximum opacity image includes applying a median filter to the maximum opacity image, dividing the maximum opacity image into overlapping sub-images with a predetermined number of pixels shifting between neighboring sub-images, computing an intensity variance for each sub-image, applying Otsu thresholding to this sub-image to obtain a segmentation if the intensity variance of a sub-image is larger than a predetermined threshold, voting segmentation results from all sub-images where pixels with more than a predetermined number of votes are categorized as foreground pixels, computing means and standard deviations of foreground intensities and background intensities, denoted respectively as $\mu_f$, $\sigma_f$, $\mu_b$ and $\sigma^b$; mapping pixels whose intensity is less than $\mu_f+\sigma_f$ to 0, pixels whose intensity is greater than $\mu_b-\sigma_b$ to 1, and linearly mapping those pixels whose intensity is between $\mu_f+\sigma_f$ and $\mu_b-\sigma_b$ to the interval [0,1], applying a vessel enhancement filter to the mapped intensities, and converting the vessel enhanced image to a binary image.

According to a further aspect of the invention, detecting the iliac bifurcation and renal artery bifurcation further includes, for each bifurcation on the aortic centerline, computing an illiac candidate score $$\text{Score} = \sum_{i=1}^{k} \int_0^T \text{Var}(W_i(t)),$$

where W is an aortic width determined by skeletonizing the aortic silhouette, t is an arc-length parameterization of the aortic skeleton, i=1, . . . , k counts a number of branches connected to each bifurcation and T is a minimum branch length, where a valid bifurcation candidate with a highest candidate score in a lower half of the maximum opacity image is selected as the iliac bifurcation, and the renal bifurcation is a first bifurcation candidate along the aortic centerline upward from the iliac bifurcation.

According to a further aspect of the invention, detecting the spinal centerline includes calculating a spine mask from horizontal edges detected in a 2D fluoroscopic spine image, and locating a spinal centerline in the 2D fluoroscopic spine image using a sliding window with the spine mask.

According to a further aspect of the invention, calculating a spine mask comprises applying a plurality of approximately horizontal Gabor filters to a spine image $I^S$ by computing a convolution $E_k = G(x, y, \lambda, \theta_k, \sigma, \gamma) * I^S$, where $$G(x, y, \lambda, \theta_k, \sigma, \gamma) = \exp\left(-\frac{x'^2 + \gamma^2 y'^2}{2\sigma^2}\right) \sin\left(2\pi \frac{x'}{\lambda}\right)$$

is a Gabor filter with $x'=x \cos \theta_k + y \sin \theta_k$ and $y'=-x \sin \theta_k$ y $\cos \theta_k$, $\lambda$ is wavelength, $\theta$ represents an orientation of a normal to parallel stripes of the Gabor function where $90-\Delta\theta \leq \theta_k \leq 90+\Delta\theta$ for a predetermined $\Delta\theta$, $\sigma$ is a width of a Gaussian envelope and $\gamma$ is a spatial aspect ratio, where $\lambda$, $\sigma$, and $\gamma$ are tuned to make a shape and size of the Gabor filter fit vertebrae, selecting, for each pixel (x, y), a maximum value $E(x,y)$ yielded by the plurality of Gabor filters, selecting those pixels above a predetermined percentile of a histogram of $E(x,y)$ as vertebrae pixels, and generating a spine mask $M(x, y)=\{0, 1\}$ from the selected pixels.

According to a further aspect of the invention, locating a spinal centerline in the 2D fluoroscopic spine image further comprises finding a value $\Delta x$ that maximizes a sum $$A = \sum_{y=0}^{H} \sum_{x=\lfloor \Delta x \rfloor}^{\lceil \Delta x + \frac{H}{3} \rceil} M(x, y),$$

where the 2D fluoroscopic spine image $I^S$ is of size H×H pixels, and $\lfloor \; \rfloor$ and $\lceil \; \rceil$ are floor and ceiling functions, respectively, and $$\left[\Delta x, \Delta x + \frac{H}{3}\right] \times [0, H]$$

defines the sliding window, and selecting a vertical line in the center of the sliding window as the spine centerline.

According to another aspect of the invention, there is provided a method of automatically initializing a pose for registration of 2D fluoroscopic abdominal aortic images with a 3D model of an abdominal aorta, including calculating a maximum opacity image from the sequence of 2D fluoroscopic abdominal aortic images obtained from a patient, binarizing the maximum opacity image to obtain an aortic silhouette, skeletonizing the aortic silhouette in the binarized maximum opacity image to extract an aortic centerline, detecting the iliac bifurcation and renal artery bifurcation from the aortic centerline, calculating a spine mask from horizontal edges detected in a 2D fluoroscopic spine image, locating a spinal centerline in the 2D fluoroscopic spine image using a sliding window with the spine mask, providing a 3D iliac bifurcation and a 3D renal artery bifurcation from a 3D image volume of the patient's abdomen, and a 3D spinal centerline from the 3D image volume of the patient's abdomen, and determining pose parameters $\{x, y, z, \theta\}$, where (x, y) denotes the translation on a table plane, z denotes a depth of the table, and $\theta$ is a rotation about the z axis, by minimizing a cost function of the 2D and 3D iliac bifurcations, the 2D and 3D renal artery bifurcation, and the 2D and 3D spinal centerlines.

According to a further aspect of the invention, the cost function is $(C_A+C_S)$, where $C_A$ is defined as $$C_A = \sqrt{\sum_{i=1}^{2}(B_i^{2D} - P_1(H \cdot B_i^{3D}))^2},$$

where $P_1$ is a projection of the 3-D bifurcations to an aortic image plane, $B_1^{2D}$ and $B_1^{3D}$ are the respective 2-D and 3-D bifurcations of the iliac arteries, $B_2^{2D}$ and $B_2^{3D}$ are the respective 2-D and 3-D bifurcations of the renal arteries, and $$H(x, y, z, \theta) = \begin{bmatrix} \cos\theta & -\sin\theta & 0 & 0 \\ \sin\theta & \cos\theta & 0 & 0 \\ 0 & 0 & 1 & 0 \\ x & y & z & 1 \end{bmatrix}$$

is the homogenous transformation matrix of the registration parameters, and $C_S$ is defined as $C_S = \text{Dist}(L_{spine}, P_2(H \cdot B_3^{3D}))$, where $P_2$ is a projection of the 3D spine centerline to a spinal image plane, $B_3^{3D}$ is a 3-D spinal landmark that is a point a predetermined distance behind the renal artery bifurcations. $L_{spine}$ is the 2-D spinal centerline, and Dist(,) is a point-to-line distance in 2-D.

According to another aspect of the invention, there is provided a non-transitory program storage device readable by a computer, tangibly embodying a program of instructions executed by the computer to perform the method steps for automatically initializing pose for registration of 2D fluoroscopic abdominal aortic images with a 3D model of an abdominal aorta.

BRIEF DESCRIPTION OF THE DRAWINGS

FIGS. 3(a)-(d) illustrate the initial steps for 2-D image binarization, according to an embodiment of the invention.

FIGS. 4(a)-(d) illustrate the final steps for 2-D image binarization, according to an embodiment of the invention.

FIGS. 6(a)-(d) illustrates the steps for 2-D spine mask detection, according to an embodiment of the invention.

FIGS. 8(a)-(e) illustrate a 2-D/3-D image registration according to an embodiment of the invention.

DETAILED DESCRIPTION OF EXEMPLARY EMBODIMENTS

Exemplary embodiments of the invention as described herein generally include systems and methods for automatically initializing pose for 2-D/3-D registration. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$ or $R^7$, the methods of the inventions are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

A 2-D/3-D registration for AAA intervention according to an embodiment of the invention uses an anteroposterior (AP) view fluoroscopic sequence of a patient with contract injection showing his/her abdominal aorta and iliac arteries. According to an embodiment of the invention, a first step is 2-D vessel bifurcation detection from the fluoroscopic sequence.

Figure 1A:
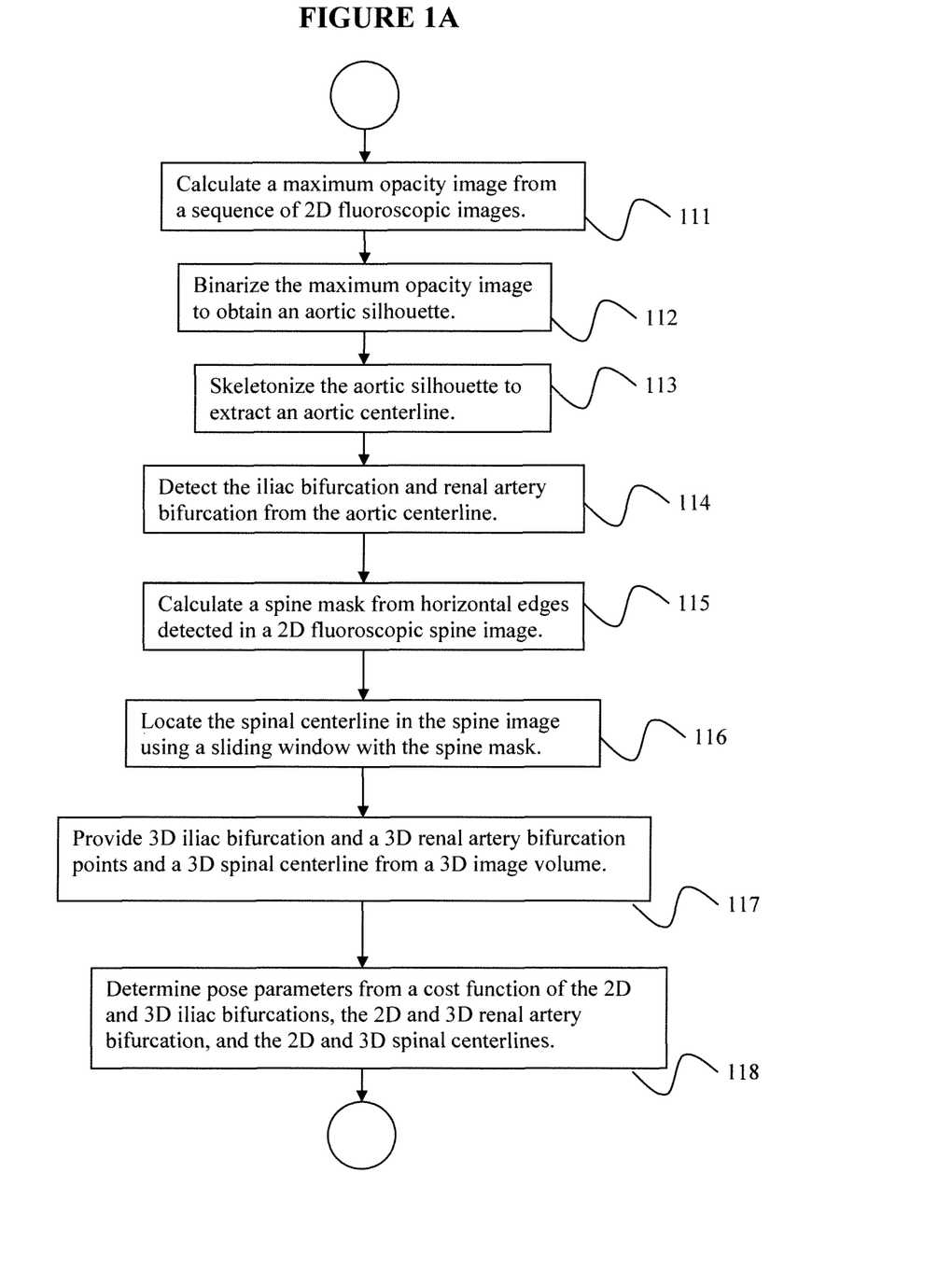
FIG. 1A is a flowchart of a pose initialization method according to an embodiment of the invention.

FIG. 1A is a flowchart of a method for automatically initializing a pose for registration of 2D fluoroscopic abdominal aortic images with a 3D model of an abdominal aorta, according to an embodiment of the invention. Referring now to the figure, a method begins at step 111 by calculating a maximum opacity image from the sequence of 2D fluoroscopic abdominal aortic images obtained from a patient. At step 112, the maximum opacity image is binarized to obtain an aortic silhouette, and the aortic silhouette is skeletonized at step 113 to extract an aortic centerline. The iliac bifurcation and renal artery bifurcation are detected from the aortic centerline at step 114, and a spine mask is calculated from horizontal edges detected in a 2D fluoroscopic spine image at step 115. At step 116, a spinal centerline can be located in the 2D fluoroscopic spine image using a sliding window with the spine mask. At step 117, a 3D iliac bifurcation and a 3D renal artery bifurcation are provided from a 3D image volume of the patient's abdomen, and a 3D spinal centerline is provided from the 3D image volume of the patient's abdomen. Pose parameters $\{x, y, z, \theta\}$ are determined at step 118, where $(x, y)$ denotes the translation on a table plane, z denotes a depth of the table, and $\theta$ is a rotation about the z axis, by minimizing a cost function of the 2D and 3D iliac bifurcations, the 2D and 3D renal artery bifurcation, and the 2D and 3D spinal centerlines. Details of these steps are provided herein below.

Fluoroscopic Sequence Processing

In an X-ray image of a contrast injected abdominal aorta, the image obtained includes all overlaying structures besides the vessels. To remove these distracting structures to see the vessel better, Digital Subtraction Angiography (DSA) is used. To compute DSA, all images produced with a contrast medium are subtracted by a "pre-contrast image": $S_j = I_j - I_0$.

However, because the contrast medium flows through the abdominal aorta to the iliac arteries, showing only a part of the vessel in each frame, a single DSA will not be able to display the complete vessel. To combine all of the DSAs to provide a complete vessel, the minimum value of each pixel across the whole DSA sequence is computed, which forms an image known as an "Maximum Opacity Image":

$$O(x,y) = \min_j S_j(x,y). \quad (1)$$

A Maximum Opacity Image according to an embodiment of the invention represents the darkest intensity across the whole fluoroscopic sequence, indicating the maximum level of contrast medium across time and therefore shows the complete blood vessel.

Vessel Centerline Extraction

By definition, vessel bifurcation is a topological feature where a main stem of vessel divides to become two smaller vessels, which can easily be detected from the vessel centerline. According to an embodiment of the invention, extracting a vessel centerline from a Maximum Opacity Image includes two steps: (1) binarizing the image to obtain a vessel silhouette; and (2) skeletonizing the vessel silhouette to extract the vessel centerline.

As the intensity of both the vessel and the background varies in the Maximum Opacity Image, directly applying a binarization method like Otsu's method will not extract a complete vessel silhouette. According to an embodiment of the invention, a vessel enhancement filter is used, followed by the Otsu thresholding. An exemplary, non-limiting vessel enhancement filter is a Frangi filter. Since a Frangi filter regards high intensity as noise, vessels with low levels of contrast medium will have high intensity (close to the background) in the Maximum Opacity Image and therefore cannot be depicted. To enhance vessels with both high and low level of contrast injection, an automatic color mapping applied before the vessel enhancement can help to adjust the foreground-background dynamic to meet the requirement of a Frangi filter.

Figure 1B:
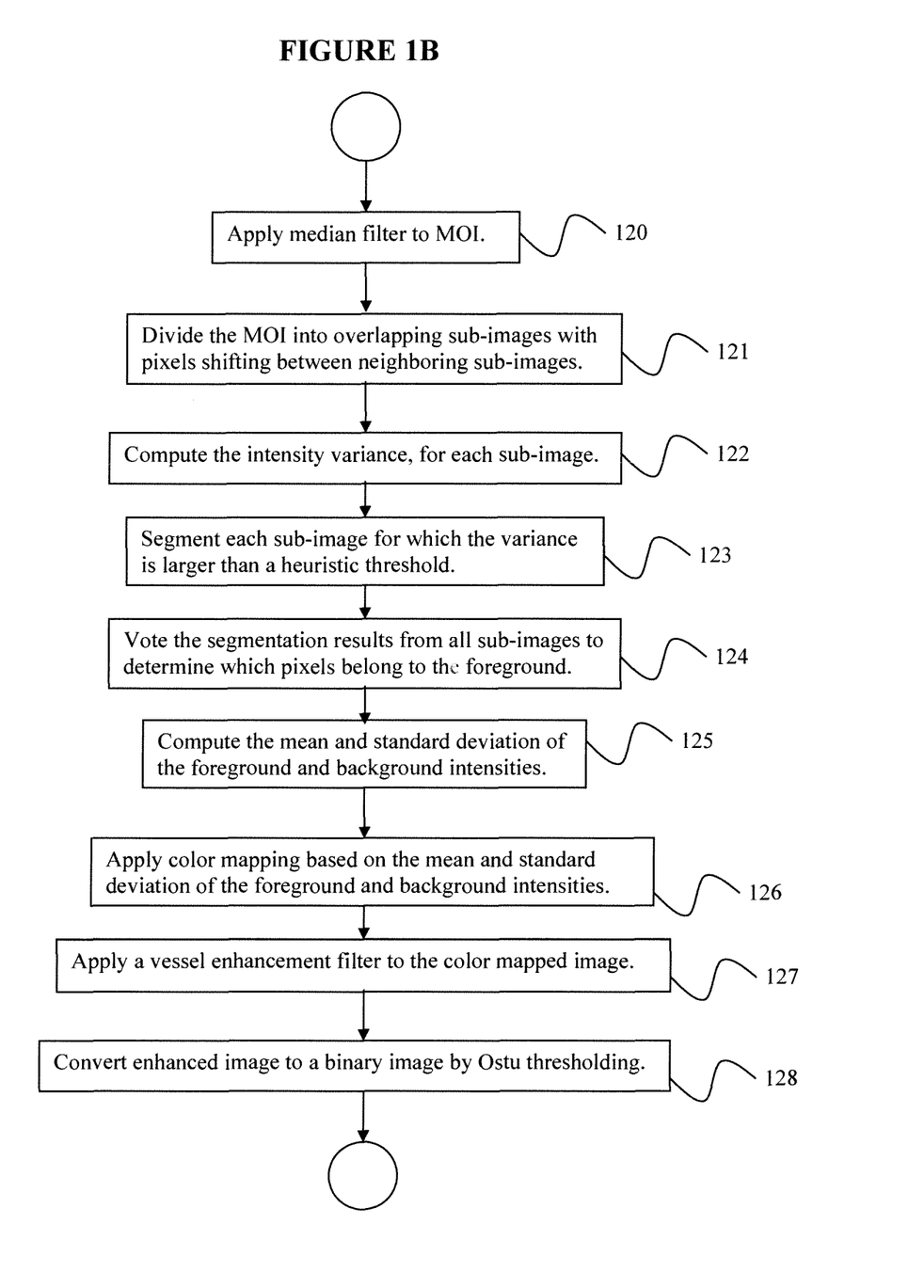
FIG. 1B is a flowchart of a method of binarizing the Maximum Opacity Image (MOI), according to an embodiment of the invention.
Figure 2:
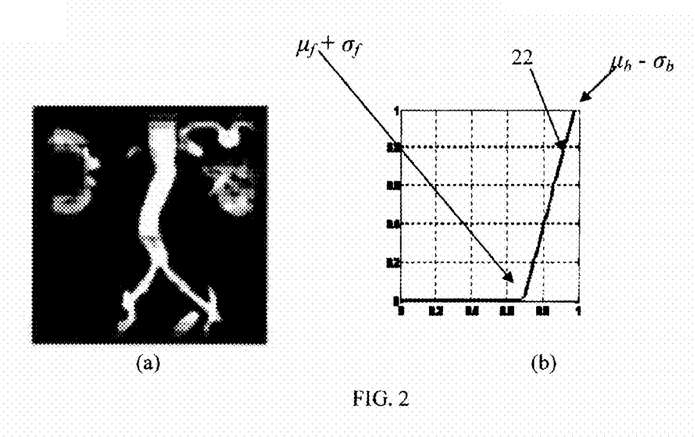
FIG. 2(a) illustrates pixel vote counting from sub-images.
FIG. 2(b) is a graph that illustrates color mapping, according to embodiments of the invention.

FIG. 1B is a flowchart of a method according to an embodiment of the invention of binarizing the Maximum Opacity Image (MOI). Referring now to the figure, a method begins at step 120 by applying a median filter to the MOI. A median filter is a filter that assigns to each pixel the median value of the pixels in a small region surrounding the pixel. For example, a rectangular 3×3 median filter will assign to the center pixel the median value of the 9 pixels. Applying a median filter on an image is to perform this operation on every pixel in the image. At step 121, the MOI is divided into 32×32 overlapping sub-images, with each sub-image shifted by 8 pixels from its nearest neighbor. With an 8-pixel shift, the overlay between neighboring sub-images is 24×32 pixels. Not that the pixel sizes and shifts of the sub-images are exemplary and non-limiting, and other size sub-images and shifts are within the scope of embodiments of the invention. An exemplary, non-limiting MOI is originally 256×256 pixels. For each sub-image, the variance of intensity is computed, at step 122. If, at step 123, the variance is larger than a heuristic threshold λ, this sub-image is considered to include both foreground and background, and Otsu thresholding is then applied on this sub-image to obtain a segmentation. Because each pixel is covered by multiple sub-images, the segmentation results from all sub-images vote at step 124 to determine whether the pixel belongs to the "foreground", and pixels with more than a predetermined number of votes are categorized as "foreground". The voting is a count of the number of sub-images in which each pixel is considered to "foreground" versus "background". FIG. 2(a) illustrates pixel vote counting from sub-images, according to embodiments of the invention. At step 125, the mean and standard deviation of the intensities in the foreground and background are then computed and denoted as $\mu_f$, $\sigma_f$, $\mu_b$, and $\sigma_b$. At step 126, a color mapping is applied to the foreground and background regions. A exemplary, non-limiting color mapping according to an embodiment of the invention is a piece-wise linear function 22 that maps pixel intensities less than $\mu_f + \sigma_f$ to 0, pixel intensities greater than $\mu_b - \sigma_b$ to 1, and linearly maps pixel intensities between $\mu_f + \sigma_f$ and $\mu_b - \sigma_b$ to the interval [0,1], as illustrated by the graph in FIG. 2(b). The vessel enhancement filter is applied after the color mapping at step 127, and after vessel enhancement, the intensity image is converted to a binary image by Ostu thresholding, at step 128.

Figure 3:
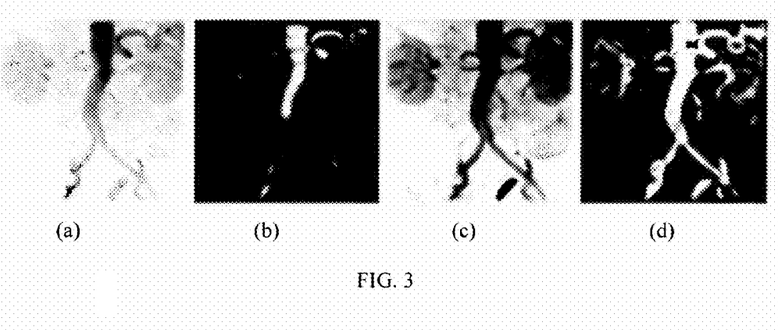

FIGS. 3(a)-(d) illustrate the initial steps for 2-D image binarization, according to an embodiment of the invention. FIG. 3(a) depicts a Maximum Opacity Image after application of a median filter. FIG. 3(b) shows that Frangi vessel enhancement on a vessel of FIG. 3(a) does not show high intensity iliac arteries. An example of applying a color mapping to a vessel of FIG. 3(a) to increase the intensity dynamic is shown in FIG. 3(c), and application of a Frangi filter to the color mapped vessel of FIG. 3(c) achieves much better vessel enhancement results, showing a complete vessel as shown in FIG. 3(d).

Figure 4:
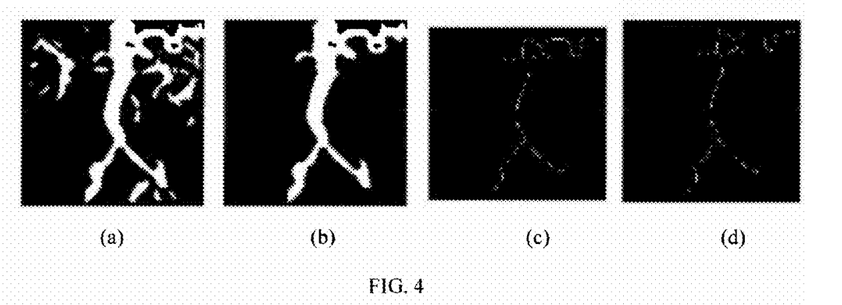

FIG. 4(a) illustrates the effect of converting the vessel enhanced intensity image to a binary image by Ostu thresholding. With the prior knowledge that the abdominal aorta and the iliac artery are large, connected vessels, connected component analysis is then applied on the binary image of FIG. 4(a) to remove small isolated components, the result of which is shown in FIG. 4(b).

With the vessel silhouette, the vessel centerline can be extracted as skeleton of the silhouette. A straightforward morphological thinning for skeleton extraction can yield many redundant branches that requires extensive skeleton pruning, which is generally not trivial. According to an embodiment of the invention, a fast marching based method is used for computing a skeleton, which generates relatively clean vessel centerlines and more importantly, provides the vessel width that will be needed for detecting the iliac artery.

Bifurcation Detection

The extracted vessel centerline may still have redundant branches and bifurcations because of either the skeletonization method or segmentation error. Therefore, the redundant branches and bifurcations need to be detected and excluded. Since the redundant branches are usually short, the length of branches connected to the bifurcation is computed. A bifurcation is considered to be valid only if all the connected branches are longer than a predetermined length. An exemplary, non-limiting length is 20 mm. An example of a vessel skeleton and the bifurcation candidates is shown in FIG. 4(c). As the width of vessel does not change much near the iliac bifurcation, the variance of the vessel width near a bifurcation candidate is used as candidate score indicating the likelihood of the candidate to be iliac bifurcation. The candidate score is computed as:

$$\text{Score} = \sum_{i=1}^{k} \int_0^T \text{Var}(W_i(t)) \quad (2)$$

where W is the vessel width provided by the skeleton extraction technique, t is an arc-length parameterization of the skeleton, i=1, . . . , k counts the number of branches connected to the bifurcation and T is a minimum branch length. An exemplary, non-limiting value for T is 20 mm. Based on a typical image acquisition protocol of an AAA stenting procedure, the iliac bifurcation would be in the lower half of the image, and a valid bifurcation candidate with the highest candidate score in the lower half of the image is selected as the iliac bifurcation. Based on the aortic anatomy, the bifurcation of the renal arteries can be detected as the first bifurcation candidate along the abdominal aorta centerline upward from the iliac bifurcation. FIG. 4(d) depicts detecting the bifurcation of the iliac arteries as the bifurcation with highest score in the lower half of the image. According to an embodiment of then invention, the iliac bifurcation and the renal artery bifurcation can serve as aortic landmarks for pose initialization.

2-D Spine Mask Detection

As a first step in detecting a 2-D spine, a 2-D spine registration mask is generated to exclude irrelevant structures. In particular, since the spine is close to being vertical in the 2-D X-ray image from the typical C-Arm angulations used during an AAA stenting procedure, a steerable filter is used, such as a Gabor filter, to select horizontal edges:

$$G(x, y, \lambda, \theta, \sigma, \gamma) = \exp\left(-\frac{x'^2 + \gamma^2 y'^2}{2\sigma^2}\right)\sin\left(2\pi\frac{x'}{\lambda}\right), \quad (3)$$

where $x'=x \cos \theta + y \sin \theta$ and $y'=-x \sin \theta + y \cos \theta$.

Figure 5:
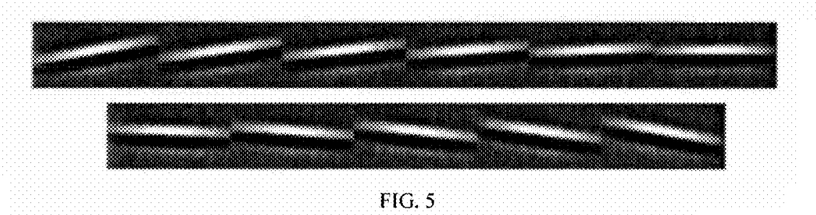
FIG. 5 depicts a plurality of Gabor filters, with different horizontal orientations, according to an embodiment of the invention.

In EQ. (3), $\lambda$ represents the wavelength of the sinusoidal factor, $\theta$ represents the orientation of the normal to the parallel stripes of a Gabor function, $\sigma$ is the sigma of the Gaussian envelope and $\gamma$ is the spatial aspect ratio that specifies the ellipticity of the support of the Gabor function. The parameter $\lambda$, $\sigma$, and $\gamma$ are tuned to make the shape and size of the Gabor filter fit the vertebrae. According to an embodiment of the invention, given that a Gabor filter yields a large value when applied to an edge with the same orientation, a plurality of Gabor filters are generated with orientations that are approximately horizontal to detect vertebrae. In one exemplary, non-limiting embodiment, there are eleven approximate horizontal orientations $\theta_k=80°, 82°, \ldots, 98°, 100°$. FIG. 5 illustrates exemplary Gabor filters used in embodiments of the invention. Each Gabor filter is applied to a spine image $I^S$ as an edge detector by computing the convolution:

$$E_k = G(x,y,\lambda,\theta_k,\sigma,\gamma)*I^S. \quad (4)$$

The maximum value of each pixel yielded by the Gabor filters is selected:

$$E(x,y) = \max_k E_k(x,y). \quad (5)$$

According to an embodiment of the invention, those pixels above a predetermined percentile in a histogram of E(x, y) are classified as vertebrae points and are used to generate the spine mask. An exemplary, non-limiting value for the predetermined percentile is 85%. To eliminate edges caused by noise and irrelevant structures, Connected Components Analysis is further applied to the spine mask to remove those isolated components with fewer than a predetermined number of pixels. An exemplary, non-limiting value for the predetermined number of pixels is 80. The final spine mask is denoted as a binary matrix $M(x,y)=\{0,1\}$.

Figure 6:
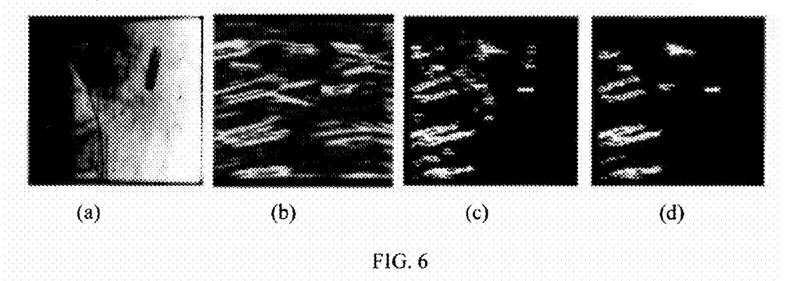

FIGS. 6(a)-(d) illustrates the steps for 2-D spine mask detection, according to an embodiment of the invention. FIG. 6(a) depicts a native spine X-ray image, FIG. 6(b) shows the result of a Gabor filter on the spine image of FIG. 6(a), FIG. 6(c) shows a vertebrae mask generated by applying an 85% threshold to the histogram, and FIG. 6(d) depicts a vertebrae mask after Connected Components Analysis is performed on the vertebrae mask of FIG. 6(c).

2-D Spine ROI Detection

In an X-ray image from a typical C-Arm angulations used during an AAA procedure, the spine is close to being vertical and occupies approximately ⅓ of the image in width. Therefore, the location of the spine can be represented as a vertical rectangular region-of-interest (ROI) with ⅓ of the image width. For an X-ray image of size H×H, a rectangular ROI with $\Delta x$ offset to the left boundary of the image is denoted as $$\left[\Delta x, \Delta x + \frac{H}{3}\right] \times [0, H].$$

Figure 7:
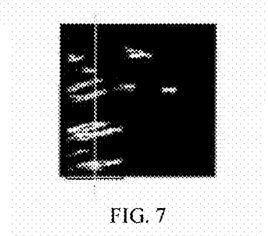
FIG. 7 depicts the detection of a spine ROI and the spine centerline, according to an embodiment of the invention.

To determine the offset $\Delta x$, the ROI can be superimposed on the image mask and the pixels in the ROI are counted:

$$A = \sum_{y=0}^{H} \sum_{x=\lfloor\Delta x\rfloor}^{\lceil\Delta x+\frac{H}{3}\rceil} M(x, y), \quad (6)$$

where $\lfloor\ \rfloor$ and $\lceil\ \rceil$ are the floor and ceiling functions, respectively. By this criterion, a sliding window with highest value of A determines the value of the offset $\Delta x$ that defines the spine ROI. A vertical line in the center of the spine ROI is selected as the spine centerline, denoted as $L_{spine}$. FIG. 7 depicts the detection of a spine ROI and the spine centerline 70, according to an embodiment of the invention.

3-D Landmark Detection

To perform a landmark-based pose estimation according to an embodiment of the invention, both 2-D and 3-D landmarks are needed. The corresponding 3-D landmarks can easily be detected from a 3-D CT volume because the vessel centerline has already been extracted from the CT volume, as disclosed in Miao, et al. With the 3-D vessel centerline, the 3-D vessel bifurcations can then simply be detected as bifurcations of the vessel centerline. Embodiments of the invention exploit the detected renal arteries bifurcation and the anatomical property that the spine is approximately behind the abdominal aorta to select a point that is a predetermined distance behind the renal arteries bifurcation as the spine landmark. An exemplary, non-limiting value for the predetermined distance is 20 mm.

Pose Estimation

The pose of a CT volume can be represented by six registration parameters, $T=\{x, y, z, \alpha, \beta, \theta\}$, where (x, y) denotes the translation on the table plane, z denotes the depth of the table, and ($\alpha$, $\beta$, $\theta$) are rotations about the x, y, z axes, respectively. The table depth is a measure of the vertical movement and position of the table on which the patient lays. Based on prior knowledge about the direction of a patient's most dominant motion and the typical C-Arm angulations used for acquiring the aorta and spine images, the registration parameters to be estimated are the patient's translation and rotation in the table plane, and the table depth. A homogenous transformation matrix of the registration parameters is:

$$H(x, y, z, \theta) = \begin{bmatrix} \cos\theta & -\sin\theta & 0 & 0 \\ \sin\theta & \cos\theta & 0 & 0 \\ 0 & 0 & 1 & 0 \\ x & y & z & 1 \end{bmatrix}. \quad (7)$$

A 3-D pose according to an embodiment of the invention is estimated by minimizing a matching cost defined on the 3-D landmarks and their 2-D counterparts. According to an embodiment of the invention, the matching cost includes two terms: (a) the vessel matching cost and (2) the spine matching cost. A vessel matching cost according to an embodiment of the invention is the mean square distance between the 2-D vessel bifurcations and the projection of the corresponding 3-D bifurcations with the given pose. Denote the projection of the 3-D bifurcations to the aorta image plane as $P_1$, the 2-D and 3-D bifurcations of the iliac arteries as $B_1^{2D}$ and $B_1^{3D}$, and the 2-D and 3-D bifurcations of the renal arteries as $B_2^{2D}$ and $B_2^{3D}$. A vessel matching cost according to an embodiment of the invention is computed as:

$$C_A = \sqrt{\sum_{i=1}^{2} (B_i^{2D} - P_1(H \cdot B_i^{3D}))^2}. \quad (8)$$

To define a spine matching cost according to an embodiment of the invention, first define a 2-D spine centerline as the vertical line in the middle of the detected spine ROI. The spine matching cost can be defined as the distance between the projection of the 3-D spine landmark and 2-D spine centerline. Denote the projection to the spine image plane as $P_2$, the 3-D spine landmark as $B_3^{3D}$, and the 2-D spine centerline as $L_{spine}$. A spine matching cost according to an embodiment of the invention is defined as:

$$C_S = \text{Dist}(L_{spine}, P_2(H \cdot B_3^{3D})), \quad (9)$$

where Dist(,) denotes the point-to-line distance in 2-D. An initial pose according to an embodiment of the invention is obtained by minimizing the final matching cost summing the vessel matching cost and spine matching cost:

$$\{x_0, y_0, z_0, \theta_0\} = \arg\min_{x,y,z,\theta}(C_A + C_S). \quad (10)$$

According to an embodiment of the invention, the initial values of the out-of-plane rotations are simply zero:

$$\alpha_0 = 0, \beta_0 = 0. \quad (11)$$

Results

Experiments were conducted to test methods according to embodiments of the invention, including: (1) Automatic 2-D vessel bifurcation detection; (2) Spine detection; and (3) Automatic 3-D pose initialization for subsequent 2-D/3-D registration. Testing data according to embodiments of the invention included 5 anteroposterior (AP) view fluoroscopic sequences showing the abdominal aorta with a contrast medium, and 3 native spine X-ray images captured 50 degrees apart from the AP view. Among the testing data was one patient with both the abdominal aorta image and the spine image that can be used to test an integrated 2-D/3-D registration system according to an embodiment of the invention.

2-D Vessel Bifurcation Detection

An automatic 2-D vessel bifurcation detection according to an embodiment of the invention was tested on 5 clinical cases. After the converting the fluoroscopic sequence to DSA images, the ground truth is manually annotated on the DSA images for validation. Using 256×256 pixel images, a Mean Square Error (MSE) for a detected iliac bifurcation is 3.34 pixels and a MSE for a renal bifurcation is 6.43 pixels. According to the projection geometry, one pixel in the X-ray image is equivalent to a ~0.8 mm displacement in 3-D. Therefore, the accuracy for a 2-D vessel bifurcation detection according to an embodiment of the invention is sufficient to bring the 3-D volume into a 15 mm capture range.

2-D Spine Detection

A 2-D spine detection according to embodiments of the invention was tested on 3 clinical cases. The ground truth of a spine centerline is manually annotated in the X-ray images as a vertical line, and the detection error is defined as a distance along the x-axis between the detected spine centerline and the ground truth. Experiments show that an average spine detection error is ~6.34 pixels. According to embodiments of the invention, the accuracy of spine detection is not essential. As long as a position of the spine can be approximated, it can be utilized for the table depth estimation to bring the 3-D volume into the capture range.

3-D Pose Initialization

After landmarks are detected in both 2-D and 3-D, a 3-D pose initialization using these landmarks is integrated into an AAA 2-D/3-D registration according to embodiments of the invention to make it fully automatic. A 3-D pose initialization and 2-D/3-D registration algorithm as disclosed in Miao, et al., is tested jointly with embodiments of the invention to validate whether initializations according to embodiments of the invention can bring the 3-D volume into the 15 mm capture range.

Figure 8:
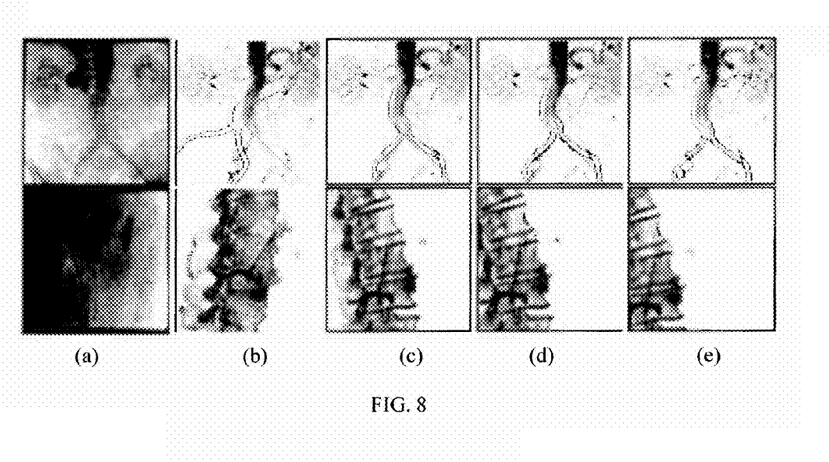

FIGS. 8(a)-(e) illustrate a 2-D/3-D image registration according to an embodiment of the invention. FIG. 8(a) shows an aorta fluoroscopic image and a spine X-ray image; FIG. 8(b) shows the starting position; FIG. 8(c) illustrates the estimation of the patient's orientation and translation on the table plane by overlaying aortic bifurcations; FIG. 8(d) illustrates the estimation of the table depth by overlaying spine landmarks; and FIG. 8(e) depicts the final registration result of an integrated 2-D/3-D registration method according to an embodiment of the invention. As shown in FIG. 8, a method according to an embodiment of the invention can bring a 3-D volume into the capture range and hence fully automate a 2-D/3-D registration.

System Implementations

It is to be understood that embodiments of the present invention can be implemented in various forms of hardware, soft are firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
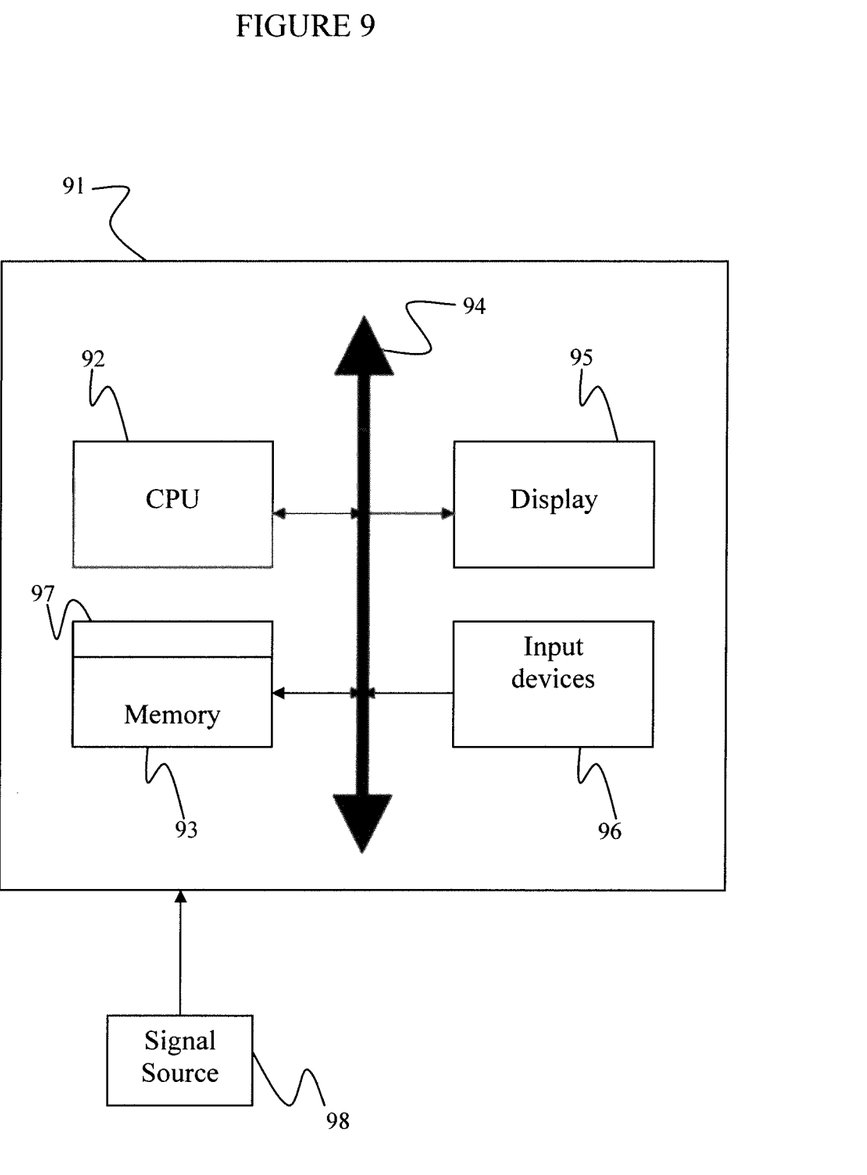
FIG. 9 is a block diagram of an exemplary computer system for implementing a method for automatically initializing pose for 2D/3D registration, according to an embodiment of the invention.

FIG. 9 is a block diagram of an exemplary computer system for implementing a method for automatically initializing pose for 2D/3D registration according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of automatically initializing pose for registration of 2D fluoroscopic abdominal aortic images with a 3D model of an abdominal aorta, comprising:
   detecting a 2D iliac bifurcation and a 2D renal artery bifurcation from a sequence of 2D fluoroscopic abdominal aortic images obtained from a patient;
   detecting a spinal centerline in a 2D fluoroscopic spine image;
   providing a 3D iliac bifurcation and a 3D renal artery bifurcation from a 3D image volume of the patient's abdomen, and a 3D spinal centerline from the 3D image volume of the patient's abdomen; and
   determining pose parameters $\{x, y, z, \theta\}$, wherein $(x, y)$ denotes the translation on a table plane, z denotes a depth of the table, and $\theta$ is a rotation about the z axis, by minimizing a cost function $(C_A + C_S)$,
   wherein $C_A$ is defined as $$C_A = \sqrt{\sum_{i=1}^{2}(B_i^{2D} - P_1(H \cdot B_i^{3D}))^2},$$

wherein $P_1$ is a projection of the 3-D bifurcations to an aortic image plane, $B_1^{2D}$ and $B_1^{3D}$ are the respective 2-D and 3-D bifurcations of the iliac arteries, $B_2^{2D}$ and $B_2^{3D}$ are the respective 2-D and 3-D bifurcations of the renal arteries, and $$H(x, y, z, \theta) = \begin{bmatrix} \cos\theta & -\sin\theta & 0 & 0 \\ \sin\theta & \cos\theta & 0 & 0 \\ 0 & 0 & 1 & 0 \\ x & y & z & 1 \end{bmatrix}$$

is the homogenous transformation matrix of the registration parameters, and $C_S$ is defined as $C_S = \text{Dist}(L_{spine}, P_2(H \cdot B_3^{3D}))$, wherein $P_2$ is a projection of the 3D spine centerline to a spinal image plane, $B_3^{3D}$ is a 3-D spinal landmark that is a point a predetermined distance behind the renal artery bifurcations, $L_{spine}$ is the 2-D spinal centerline, and $\text{Dist}(,)$ is a point-to-line distance in 2-D.

2. The method of claim 1, wherein detecting an iliac bifurcation and a renal artery bifurcation comprises:
   calculating a maximum opacity image from the sequence of 2D fluoroscopic abdominal aortic images obtained from a patient;
   binarizing the maximum opacity image to obtain an aortic silhouette;
   skeletonizing the aortic silhouette in the binarized maximum opacity image to extract an aortic centerline; and
   detecting the iliac bifurcation and renal artery bifurcation from the aortic centerline.

3. The method of claim 2, wherein the sequence of 2D fluoroscopic abdominal aortic images were preprocessed to subtract a pre-contrast image from each image of the sequence of 2D fluoroscopic images, wherein the patient was provided with a contrast injection prior to acquiring the sequence of 2D fluoroscopic images.

4. The method of claim 3, wherein calculating the maximum opacity image $O(x,y)$ comprises calculating $O(x,y) = \min_j S_j(x,y)$, wherein $S_j = I_j - I_0$, wherein $I_0$ is the pre-contrast image and $I_j$ is the $j^{th}$ image in the sequence of 2D fluoroscopic images.

5. The method of claim 2, wherein binarizing the maximum opacity image further comprises:
   applying a median filter to the maximum opacity image;
   dividing the maximum opacity image into overlapping sub-images with a predetermined number of pixels shifting between neighboring sub-images;
   computing an intensity variance for each sub-image;
   if the intensity variance of a sub-image is larger than a predetermined threshold, applying Otsu thresholding to this sub-image to obtain a segmentation;
   voting segmentation results from all sub-images wherein pixels with more than a predetermined number of votes are categorized as foreground pixels;
   computing means and standard deviations of foreground intensities and background intensities, denoted respectively as $\sigma_f$, $\sigma_f$, $\mu_b$ and $\sigma_b$;
   mapping pixels whose intensity is less than $\mu_f + \sigma_f$ to 0, pixels whose intensity is greater than $\mu_b - \sigma_b$ to 1, and linearly mapping those pixels whose intensity is between $\mu_f + \sigma_f$ and $\mu_b - \sigma_b$ to the interval $[0,1]$;
   applying a vessel enhancement filter to the mapped intensities; and
   converting the vessel enhanced image to a binary image.

6. The method of claim 2, wherein detecting the iliac bifurcation and renal artery bifurcation further comprises, for each bifurcation on the aortic centerline, computing an illiac candidate score $$\text{Score} = \sum_{i=1}^{k} \int_0^T \text{Var}(W_i(t)),$$

wherein W is an aortic width determined by skeletonizing the aortic silhouette, t is an arc-length parameterization of the aortic skeleton, $i=1, \ldots, k$ counts a number of branches connected to each bifurcation and T is a minimum branch length, wherein a valid bifurcation candidate with a highest candidate score in a lower half of the maximum opacity image is selected as the iliac bifurcation, and the renal bifurcation is a first bifurcation candidate along the aortic centerline upward from the iliac bifurcation.

7. The method of claim 1, wherein detecting the spinal centerline comprises:
calculating a spine mask from horizontal edges detected in a 2D fluoroscopic spine image; and
locating a spinal centerline in the 2D fluoroscopic spine image using a sliding window with the spine mask.

8. The method of claim 7, wherein calculating a spine mask comprises applying a plurality of approximately horizontal Gabor filters to a spine image $I^S$ by computing a convolution $E_k = G(x, y, \lambda, \theta_k, \sigma, \gamma) * I^S$, wherein $$G(x, y, \lambda, \theta_k, \sigma, \gamma) = \exp\left(-\frac{x'^2 + \gamma^2 y'^2}{2\sigma^2}\right) \sin\left(2\pi \frac{x'}{\lambda}\right)$$

is a Gabor filter with $x' = x \cos \theta_k + y \sin \theta_k$ and $y' = -x \sin \theta_k + y \cos \theta_k$, $\lambda$ is wavelength, $\theta$ represents an orientation of a normal to parallel stripes of the Gabor function wherein $90 - \Delta\theta \leq \theta_k \leq 90 + \Delta\theta$ for a predetermined $\Delta\theta$, $\sigma$ is a width of a Gaussian envelope and $\gamma$ is a spatial aspect ratio, wherein $\lambda$, $\sigma$, and $\gamma$ are tuned to make a shape and size of the Gabor filter fit vertebrae;
selecting, for each pixel (x, y), a maximum value E(x,y) yielded by the plurality of Gabor filters;
selecting those pixels above a predetermined percentile of a histogram of E(x,y) as vertebrae pixels; and
generating a spine mask M(x,y)={0, 1} from the selected pixels.

9. The method of claim 8, wherein locating a spinal centerline in the 2D fluoroscopic spine image further comprises finding a value $\Delta x$ that maximizes a sum $$A = \sum_{y=0}^{H} \sum_{x=\lfloor \Delta x \rfloor}^{\lceil \Delta x + \frac{H}{3} \rceil} M(x, y),$$

wherein the 2D fluoroscopic spine image $I^S$ is of size H×H pixels, and $\lfloor \ \rfloor$ and $\lceil \ \rceil$ are floor and ceiling functions, respectively, and $$\left[\Delta x, \Delta x + \frac{H}{3}\right] \times [0, H]$$

defines the sliding window; and
selecting a vertical line in the center of the sliding window as the spine centerline.

10. A method of automatically initializing a pose for registration of 2D fluoroscopic abdominal aortic images with a 3D model of an abdominal aorta, comprising:
calculating a maximum opacity image from the sequence of 2D fluoroscopic abdominal aortic images obtained from a patient;
binarizing the maximum opacity image to obtain an aortic silhouette;
skeletonizing the aortic silhouette in the binarized maximum opacity image to extract an aortic centerline;
detecting the iliac bifurcation and renal artery bifurcation from the aortic centerline;

calculating a spine mask from horizontal edges detected in a 2D fluoroscopic spine image;
locating a spinal centerline in the 2D fluoroscopic spine image using a sliding window with the spine mask;
providing a 3D iliac bifurcation and a 3D renal artery bifurcation from a 3D image volume of the patient's abdomen, and a 3D spinal centerline from the 3D image volume of the patient's abdomen; and
determining pose parameters {x, y, z, θ}, wherein (x, y) denotes the translation on a table plane, z denotes a depth of the table, and θ is a rotation about the z axis, by minimizing a cost function of the 2D and 3D iliac bifurcations, the 2D and 3D renal artery bifurcation, and the 2D and 3D spinal centerlines.

11. The method of claim 10, wherein said cost function is $(C_A + C_S)$,
wherein $C_A$ is defined as $$C_A = \sqrt{\sum_{i=1}^{2} (B_i^{2D} - P_1(H \cdot B_i^{3D}))^2},$$

wherein $P_1$ is a projection of the 3-D bifurcations to an aortic image plane, $B_1^{2D}$ and $B_1^{3D}$ are the respective 2-D and 3-D bifurcations of the iliac arteries, $B_2^{2D}$ and $B_2^{3D}$ are the respective 2-D and 3-D bifurcations of the renal arteries, and $$H(x, y, z, \theta) = \begin{bmatrix} \cos\theta & -\sin\theta & 0 & 0 \\ \sin\theta & \cos\theta & 0 & 0 \\ 0 & 0 & 1 & 0 \\ x & y & z & 1 \end{bmatrix}$$

is the homogenous transformation matrix of the registration parameters, and $C_S$ is defined as $C_S = \text{Dist}(L_{spine}, P_2(H \cdot B_3^{3D}))$, wherein $P_2$ is a projection of the 3D spine centerline to a spinal image plane, $B_3^{3D}$ is a 3-D spinal landmark that is a point a predetermined distance behind the renal artery bifurcations, $L_{spine}$ is the 2-D spinal centerline, and Dist(,) is a point-to-line distance in 2-D.

12. A non-transitory program storage device readable by a computer, tangibly embodying a program of instructions executed by the computer to perform the method steps for automatically initializing pose for registration of 2D fluoroscopic abdominal aortic images with a 3D model of an abdominal aorta, the method comprising the steps of:
detecting a 2D iliac bifurcation and a 2D renal artery bifurcation from a sequence of 2D fluoroscopic abdominal aortic images obtained from a patient;
detecting a spinal centerline in a 2D fluoroscopic spine image;
providing a 3D iliac bifurcation and a 3D renal artery bifurcation from a 3D image volume of the patient's abdomen, and a 3D spinal centerline from the 3D image volume of the patient's abdomen; and
determining pose parameters {x, y, z, θ}, wherein (x, y) denotes the translation on a table plane, z denotes a depth of the table, and θ is a rotation about the z axis, by minimizing a cost function $(C_A + C_S)$,
wherein $C_A$ is defined as $$C_A = \sqrt{\sum_{i=1}^{2}(B_i^{2D} - P_1(H \cdot B_i^{3D}))^2},$$

wherein $P_1$ is a projection of the 3-D bifurcations to an aortic image plane, $B_1^{2D}$ and $B_1^{3D}$ are the respective 2-D and 3-D bifurcations of the iliac arteries, $B_2^{2D}$ and $B_2^{3D}$ are the respective 2-D and 3-D bifurcations of the renal arteries, and $$H(x, y, z, \theta) = \begin{bmatrix} \cos\theta & -\sin\theta & 0 & 0 \\ \sin\theta & \cos\theta & 0 & 0 \\ 0 & 0 & 1 & 0 \\ x & y & z & 1 \end{bmatrix}$$

is the homogenous transformation matrix of the registration parameters, and $C_S$ is defined as $C_S = \text{Dist}(L_{spine}, P_2(H \cdot B_3^{3D}))$, wherein $P_2$ is a projection of the 3D spine centerline to a spinal image plane, $B_3^{3D}$ is a 3-D spinal landmark that is a point a predetermined distance behind the renal artery bifurcations, $L_{spine}$ is the 2-D spinal centerline, and Dist(,) is a point-to-line distance in 2-D.

13. The computer readable program storage device of claim 12, wherein detecting an iliac bifurcation and a renal artery bifurcation comprises:
calculating a maximum opacity image from the sequence of 2D fluoroscopic abdominal aortic images obtained from a patient;
binarizing the maximum opacity image to obtain an aortic silhouette;
skeletonizing the aortic silhouette in the binarized maximum opacity image to extract an aortic centerline; and
detecting the iliac bifurcation and renal artery bifurcation from the aortic centerline.

14. The computer readable program storage device of claim 13, wherein the sequence of 2D fluoroscopic abdominal aortic images were preprocessed to subtract a pre-contrast image from each image of the sequence of 2D fluoroscopic images, wherein the patient was provided with a contrast injection prior to acquiring the sequence of 2D fluoroscopic images.

15. The computer readable program storage device of claim 14, wherein calculating the maximum opacity image $O(x,y)$ comprises calculating $O(x,y) = \min_j S_j(x,y)$, wherein $S_j = I_j - I_0$, wherein $I_0$ is the pre-contrast image and $I_j$ is the $j^{th}$ image in the sequence of 2D fluoroscopic images.

16. The computer readable program storage device of claim 13, wherein binarizing the maximum opacity image further comprises:
applying a median filter to the maximum opacity image;
dividing the maximum opacity image into overlapping sub-images with a predetermined number of pixels shifting between neighboring sub-images;
computing an intensity variance for each sub-image;
if the intensity variance of a sub-image is larger than a predetermined threshold, applying Otsu thresholding to this sub-image to obtain a segmentation;
voting segmentation results from all sub-images wherein pixels with more than a predetermined number of votes are categorized as foreground pixels;
computing means and standard deviations of foreground intensities and background intensities, denoted respectively as $\mu_f$, $\sigma_f$, $\mu_b$ and $\sigma_b$;
mapping pixels whose intensity is less than $\mu_f + \sigma_f$ to 0, pixels whose intensity is greater than $\mu_b - \sigma_b$ to 1, and linearly mapping those pixels whose intensity is between $\mu_f + \sigma_f$ and $\mu_b - \sigma_b$ to the interval [0,1];
applying a vessel enhancement filter to the mapped intensities; and
converting the vessel enhanced image to a binary image.

17. The computer readable program storage device of claim 13, wherein detecting the iliac bifurcation and renal artery bifurcation further comprises, for each bifurcation on the aortic centerline, computing an illiac candidate score $$\text{Score} = \sum_{i=1}^{k} \int_0^T \text{Var}(W_i(t)),$$

wherein W is an aortic width determined by skeletonizing the aortic silhouette, t is an arc-length parameterization of the aortic skeleton, $i = 1, \ldots, k$ counts a number of branches connected to each bifurcation and T is a minimum branch length, wherein a valid bifurcation candidate with a highest candidate score in a lower half of the maximum opacity image is selected as the iliac bifurcation, and the renal bifurcation is a first bifurcation candidate along the aortic centerline upward from the iliac bifurcation.

18. The computer readable program storage device of claim 12, wherein detecting the spinal centerline comprises:
calculating a spine mask from horizontal edges detected in a 2D fluoroscopic spine image; and
locating a spinal centerline in the 2D fluoroscopic spine image using a sliding window with the spine mask.

19. The computer readable program storage device of claim 18, wherein calculating a spine mask comprises applying a plurality of approximately horizontal Gabor filters to a spine image $I^S$ by computing a convolution $$E_k = G(x,y,\lambda,\theta_k,\sigma,\gamma) * I^S,$$

wherein $$G(x, y, \lambda, \theta_k, \sigma, \gamma) = \exp\left(-\frac{x'^2 + \gamma^2 y'^2}{2\sigma^2}\right) \sin\left(2\pi \frac{x'}{\lambda}\right)$$

is a Gabor filter with $x' = x \cos\theta_k + y \sin\theta_k$ and $y' = -x \sin\theta_k + y \cos\theta_k$, $\lambda$ is wavelength, $\theta$ represents an orientation of a normal to parallel stripes of the Gabor function wherein $90 - \Delta\theta \leq \theta_k \leq 90 + \Delta\theta$ for a predetermined $\Delta\theta$, $\sigma$ is a width of a Gaussian envelope and $\gamma$ is a spatial aspect ratio, wherein $\lambda$, $\sigma$, and $\gamma$ are tuned to make a shape and size of the Gabor filter fit vertebrae;
selecting, for each pixel $(x, y)$, a maximum value $E(x,y)$ yielded by the plurality of Gabor filters;
selecting those pixels above a predetermined percentile of a histogram of $E(x,y)$ as vertebrae pixels; and
generating a spine mask $M(x,y) = \{0, 1\}$ from the selected pixels.

20. The computer readable program storage device of claim 19, wherein locating a spinal centerline in the 2D fluoroscopic spine image further comprises finding a value $\Delta x$ that maximizes a sum $$A = \sum_{y=0}^{H} \sum_{x=\lfloor \Delta x \rfloor}^{\lceil \Delta x + \frac{H}{3} \rceil} M(x, y),$$

wherein the 2D fluoroscopic spine image $I^S$ is of size H×H pixels, and $\lfloor \ \rfloor \lceil \ \rceil$ are floor and ceiling functions, respectively, and $$\left[\Delta x, \Delta x + \frac{H}{3}\right] \times [0, H]$$

defines the sliding window; and
selecting a vertical line in the center of the sliding window as the spine centerline.

* * * * *